(12) United States Patent
Segura Puchades et al.

(10) Patent No.: US 12,730,201 B2
(45) Date of Patent: Sep. 8, 2026

(54) ACTIVE IMAGING SYSTEM

(71) Applicant: Commissariat à l'Energie Atomique et aux Energies Alternatives, Paris (FR)

(72) Inventors: Josep Segura Puchades, Grenoble (FR); Anis Daami, Grenoble (FR); Laurent Frey, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 942 days.

(21) Appl. No.: 18/064,257

(22) Filed: Dec. 10, 2022

(65) Prior Publication Data

US 2023/0199282 A1 Jun. 22, 2023

(30) Foreign Application Priority Data

Dec. 20, 2021 (FR) ...................................... 2113965

(51) Int. Cl.
*G01S 7/4912* (2020.01)
*G01S 7/4915* (2020.01)
(Continued)

(52) U.S. Cl.
CPC .......... *G01S 7/4917* (2013.01); *G01S 7/4915* (2013.01); *G01S 17/34* (2020.01); *G01S 17/894* (2020.01)

(58) Field of Classification Search
CPC ...... G01S 7/4917; G01S 7/4915; G01S 17/34; G01S 17/894; G01S 17/89
See application file for complete search history.

(56) References Cited

U.S. PATENT DOCUMENTS 3,841,755 A * 10/1974 Debart .................... G01S 17/50 356/28
2021/0063573 A1 3/2021 Suzuki et al.
(Continued)

FOREIGN PATENT DOCUMENTS

FR 3109667 A1 10/2021
WO 2021144357 A1 7/2021

OTHER PUBLICATIONS

Preliminary Search Report for French Application No. 2113965 dated Jul. 28, 2022, 2 pages.
(Continued)

*Primary Examiner* — Isam A Alsomiri
*Assistant Examiner* — Joseph C Fritchman
(74) *Attorney, Agent, or Firm* — Jordan IP Law, LLC

(57) ABSTRACT

An image sensor comprises a plurality of pixels (Pix), each comprising an elementary photodetector (211), wherein each pixel (Pix) comprises a circuit (201, 203) for detecting a beat frequency of a portion of a heterodyne beam received by the elementary photodetector (211) of the pixel, and wherein, in each pixel (Pix), the detection circuit (201, 203) comprises a frequency comparator (221) comprising a first input node (E1) receiving a first periodic AC signal ($f_{pix}$) having a frequency equal to the beat frequency, a second input node (E2) receiving a second AC signal ($f_{ramp}$) of variable frequency, and an output node (S) delivering an output signal switching from a first state to a second state when the frequency of the second signal ($f_{ramp}$) exceeds the frequency of the first signal ($f_{pix}$).

10 Claims, 4 Drawing Sheets

(51) Int. Cl.
*G01S 17/34* (2020.01)
*G01S 17/894* (2020.01)

(56) References Cited

U.S. PATENT DOCUMENTS

2022/0011417 A1* 1/2022 Hao ...................... G01S 7/4917
2024/0053256 A1* 2/2024 Nishioka ................ G01S 7/497

OTHER PUBLICATIONS

Yang, Minhao, Shih-Chii Liu, and Tobi Delbruck. “A dynamic vision sensor with 1% temporal contrast sensitivity and in-pixel asynchronous delta modulator for event encoding.” IEEE Journal of Solid-State Circuits 50.9 (2015): 2149-2160.

Zhao, Jun, and Kim Yong-Bin. “A low-power digitally controlled oscillator for all digital phase-locked loops.” VLSI Design 2010 (2010).

* cited by examiner

ACTIVE IMAGING SYSTEM

FIELD

The present disclosure generally concerns the field of active imaging, and particularly the field of three-dimensional scene imaging.

BACKGROUND

An active imaging system conventionally comprises a light source configured to illuminate the scene to be observed, and an image sensor arranged to receive a light beam emitted by the source and reflected by the scene. Active imaging systems where the sensor is adapted to determining depth, and possibly speed, values of the observed scene, for example to obtain a depth, and possibly speed, map of the scene are more particularly considered herein.

Frequency-modulated continuous wave (FMCW) active imaging systems, also called FMCW lidars, are here more particularly considered.

In such a system, the light source is a coherent source, for example a laser source, emitting a frequency-modulated radiation, for example, according to a periodic linear ramp. The radiation emitted by the source is divided into a reference beam and an object beam. The reference beam is sent to the image sensor without crossing the scene, the object beam is projected onto the scene where it is reflected or back-scattered towards the sensor. The reference beam and the object beam reflected by the scene interfere on the image sensor. The interferences generate on each pixel of the image sensor a beat having a frequency representative of the delay between the two beams, and thus of the depth of the point of the scene seen by the pixel.

Patent application WO2021144357A1 previously filed by the applicant describes an example of forming of such a system.

It would be desirable to at least partly improve certain aspects of known active imaging systems. In particular, it would be desirable, in a FMCW imaging system of the type described in patent application WO2021144357A1, to be able to simplify the electronics used to measure the beat frequency of the heterodyne beam received by the pixels of the image sensor.

SUMMARY

For this purpose, an embodiment provides an image sensor comprising a plurality of pixels, each comprising an elementary photodetector, the sensor comprising, for each pixel, a circuit for detecting a beat frequency of a portion of a heterodyne beam received by the elementary photodetector of the pixel, the detection circuit comprising a frequency comparator comprising a first input node receiving a first periodic AC signal having a frequency equal to said beat frequency, a second input node receiving a second AC signal of variable frequency, and an output node delivering an output signal switching from a first state to a second state when the frequency of the second signal exceeds the frequency of the first signal.

According to an embodiment, the sensor comprises a circuit for generating the second signal, common to all the pixels of the sensor.

According to an embodiment, the circuit for generating the second signal comprises a digitally-controlled oscillator delivering the second signal, and a digital counter generating a signal for controlling the digitally-controlled oscillator.

According to an embodiment, the sensor comprises, for each pixel, a digital register controlled by the output signal of the frequency comparator of the pixel and configured to store the value of the control signal of the digitally-controlled oscillator at the switching of the output signal of the frequency comparator of the pixel.

According to an embodiment, the sensor further comprises a circuit for addressing and for reading from the digital registers of the pixels.

According to an embodiment, each pixel comprises a circuit for detecting said beat frequency, the sensor comprising circuits of event-based detection of the switchings of the output signals of the frequency comparators of the pixels, said circuits being configured to, at each switching of the output signal of the frequency comparator of a pixel, decode the address of the pixel where the switching has occurred, and write into a memory circuit said address as well as the value of the control signal of the digitally-controlled oscillator at the time of the switching.

According to an embodiment, the circuit for generating the second signal comprises a voltage-controlled oscillator delivering the second signal, and a circuit for generating a control voltage of the voltage-controlled oscillator.

According to an embodiment, the sensor comprises, for each pixel, a sampling circuit controlled by the output signal of the frequency comparator and configured to store the value of the control voltage of the voltage-controlled oscillator at the switching of the output signal of the frequency comparator.

According to an embodiment, the sensor comprises, for each pixel a circuit for amplifying and filtering an electric signal delivered by the photodetector of the pixel, and a circuit for quantizing over 1 bit an AC component of an output signal of the amplification and filtering circuit, said quantization circuit delivering the first periodic AC signal applied to the first input node of the frequency comparator of the pixel.

Another embodiment provides an imaging system comprising:

- an image sensor such as defined hereabove;
- a laser source configured to emit a frequency-modulated light beam;
- an optical splitter configured to split the laser beam emitted by the source into a reference beam and an object beam directed towards a scene to be analyzed; and
- an optical assembly configured to project or convey onto the image sensor a recombined beam formed by the superimposition of the reference beam and of the object beam reflected by the scene.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the forming of the different elements of the described systems has not been detailed, the forming of these elements being within the abilities of those skilled in the art based on the indications of the present disclosure. Further, the various possible applications that the described imaging systems and sensors have not been detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
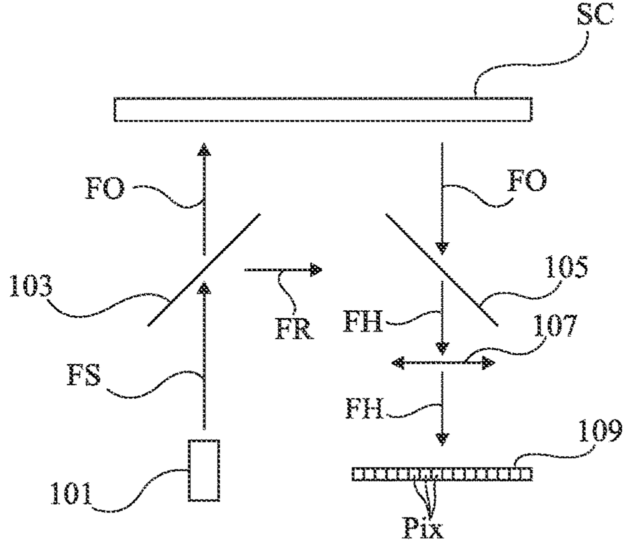
FIG. 1 shows in very simplified fashion an example of an active imaging system according to an embodiment.

FIG. 1 shows in very simplified fashion an example of an active imaging system according to an embodiment.

The system of FIG. 1 comprises a coherent light source 101, for example, a laser source, adapted to emitting a coherent beam FS. Source 101 is for example an infrared emission source. The system of FIG. 1 further comprises an optical splitter 103 adapted to dividing beam FS into an object beam OF and a reference beam FR. Object beam OF is projected onto a scene SC, a depth image of which is desired to be acquired. The system of FIG. 1 further comprises an optical combiner 105 adapted to spatially superimposing the object beam OF reflected or back-scattered by scene SC, and the reference beam FR non-deformed by the scene, to obtain a recombined beam FH, also called heterodyne beam. The system of FIG. 1 further comprises an image sensor 109 comprising a plurality of pixels Pix, having recombined beam FH projected onto it. For this purpose, the imaging system may comprise an optical system 107, arranged between combiner 105 and image sensor 109, adapted to focusing recombined beam FH onto image sensor 109. As a variant, combiner system 105 may be arranged between optical system 107 and image sensor 109.

The optical frequency of light source 101 is modulated according to a predefined law, for example, a continuous law, for example, a periodic linear law. In other words, the optical frequency of source 101 varies over time according to said predefined law.

Sensor 109 comprises a plurality of pixels Pix, for example identical to within manufacturing dispersions, for example, arranged in an array. Each pixel receives a portion of recombined beam FH corresponding to a point of the scene to be imaged. The light signal received by each pixel periodically varies in intensity according to a beat frequency fB equal to the optical frequency difference between reference beam FR and the portion of object beam OF seen by the pixel. Beat frequency fB is representative of the delay between the reference beam and the object beam, and thus of the distance or depth of the point of the scene seen by the pixel. As an example, beat frequency fB is in the range from 0 to 1,000 kHz, for example from 0 to 10 kHz.

Each pixel Pix comprises a photodetector, for example, a photodiode, a microbolometer, or any other detector sensitive to the radiation emitted by source 101, and a circuit for detecting the beat frequency fB of the portion of recombined beam FH received by the photodetector of the pixel. In other words, each pixel Pix is adapted to determining the oscillation frequency of an incident light signal periodically varying in intensity.

Figure 2:
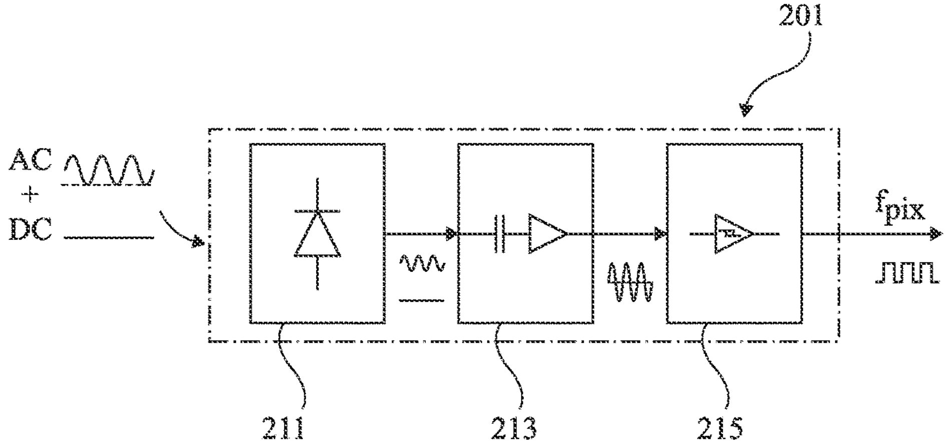
FIG. 2 schematically shows, in the form of blocks, a portion of a circuit of a pixel of an image sensor of the system of FIG. 1.

FIG. 2 schematically shows in the form of blocks part of the circuits of a pixel Pix of the image sensor 109 of the system of FIG. 1. More particularly, FIG. 2 illustrates a chain 201 of analog reception and of digitization of the signal of pixel Pix.

Reception chain 201 comprises a photodetector 211, for example, a photodiode, adapted to converting a light signal received by the pixel into an electric signal, for example, a current or a voltage.

As has been schematically shown in the drawing, the incident light signal received by photodetector 211 comprises a DC component particularly resulting from the ambient luminosity and from the local oscillator, and an AC component resulting from the beat of recombined heterodyne beam FH. The electric output signal of photodetector 211 also comprises a DC component corresponding to the DC component of the incident light signal, and a periodic AC component corresponding to the AC component of the incident light signal.

In the example of FIG. 2, the reception chain 201 of pixel Pix further comprises an amplification and filtering circuit 213 adapted to amplifying the AC component of the electric output signal of photodetector 211 and to filtering (blocking) the DC component of this signal.

In this example, reception chain 201 further comprises a comparator 215 adapted to converting the output signal of circuit 213 into a digital signal or periodic binary signal $f_{pix}$, for example, a periodic square pulse voltage, having a frequency equal to the frequency of the AC component of the incident light signal, to ease the determination of said frequency by digital processing circuits.

Figure 3:
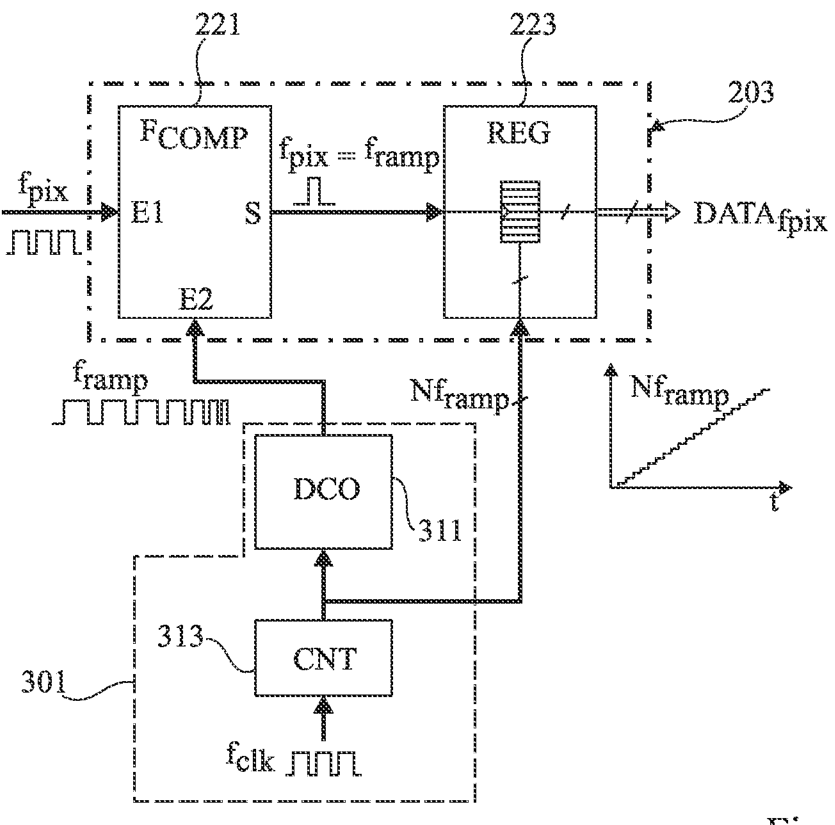
FIG. 3 schematically shows in the form of blocks another portion of the circuits of the image sensor of the system of FIG. 1.

FIG. 3 schematically shows in the form of blocks another part of the circuits of the image sensor of the system of FIG. 1. FIG. 3 shows in particular a digital processing chain 203 of a pixel Pix of the sensor, and peripheral circuits for controlling the sensor pixels Pix.

According to an aspect of an embodiment, in each pixel Pix, the digital processing chain 203 of the pixel comprises a frequency comparator 221 ($F_{COMP}$).

The frequency comparator comprises a first input node E1 receiving the signal having its frequency $f_{pix}$ desired to be determined, and a second input node E2 receiving an AC reference signal $f_{ramp}$ of variable frequency.

Signal $f_{ramp}$ is for example a periodic digital signal of same shape and of same amplitude as signal $f_{pix}$, for example a periodic square pulse voltage. The frequency of signal $f_{ramp}$ varies, for example, in stages, according to a predefined law, for example according to an increasing law, for example linear. As an example, the frequency of signal $f_{ramp}$ varies between a predefined minimum and maximum frequency.

Frequency comparator 221 further comprises a node S for delivering an output signal, for example, a binary signal. The output signal of comparator 221 changes state when the frequency of signal $f_{ramp}$ reaches the frequency of signal $f_{pix}$. As an example, the output signal of comparator 221 is in a first state, for example, a low state, as long as the frequency of signal $f_{ramp}$ is lower than the frequency of signal $f_{pix}$, and switches to a second state, for example, a high state, when the frequency of signal $f_{ramp}$ exceeds the frequency of signal $f_{pix}$. This state change is detected by the pixel, which stores a value representative of the frequency of signal $f_{ramp}$ at the time of the switching of the output signal of comparator 221. This value is representative of the frequency of signal $f_{pix}$, and thus of the depth of the point of the scene seen by the pixel, and defines an output value $DATA_{fpix}$ of the pixel.

In the example of FIG. 3, signal $f_{ramp}$ is generated by a peripheral circuit 301 external to pixels Pix. The sensor for example comprises a single circuit 301 common to all the sensor pixels Pix. Thus, the same signal $f_{ramp}$ may be simultaneously applied to all the sensor pixels Pix.

In this example, circuit 301 comprises a digitally-controlled oscillator 311 or DCO, delivering signal $f_{ramp}$.

Circuit 301 further comprises a counter 313 incremented at each period of a periodic clock signal of constant frequency $f_{clk}$. Counter value $N_{framp}$ is applied at the input of oscillator 311 and defines the frequency of the output signal $f_{ramp}$ of the oscillator. Thus, at each period of clock signal $f_{clk}$, the frequency of signal $f_{ramp}$ is incremented.

The digital output signal $N_{framp}$ of counter 311 is further transmitted to all the sensor pixels Pix, in parallel with signal $f_{ramp}$.

The forming of digitally-controlled oscillator 311 is within the abilities of those skilled in the art and will not be detailed herein. An example of embodiment of such an oscillator is for example described in the article entitled "A Low-Power Digitally Controlled Oscillator for All Digital Phase-Locked Loops" (Jun, Zhao & Yong-Bin, Kim. (2010). VLSI Design. 2010. 10.1155/2010/946710.). The described embodiments are however not limited to this specific example.

In this example, in each pixel, the digital processing chain 203 of the pixel comprises a storage register 223 (REG) having an input port receiving the output signal $N_{framp}$ of counter 313. Register 223 is controlled by the output signal of comparator 221. Thus, when the output of the comparator of the pixel switches state, that is, when the frequency of signal $f_{ramp}$ exceeds the frequency of signal $f_{pix}$ detected by the pixel, the current value of signal $N_{framp}$ is stored in pixel register 223. This value defines the output value $DATA_{fpix}$ of the pixel.

Figure 4:
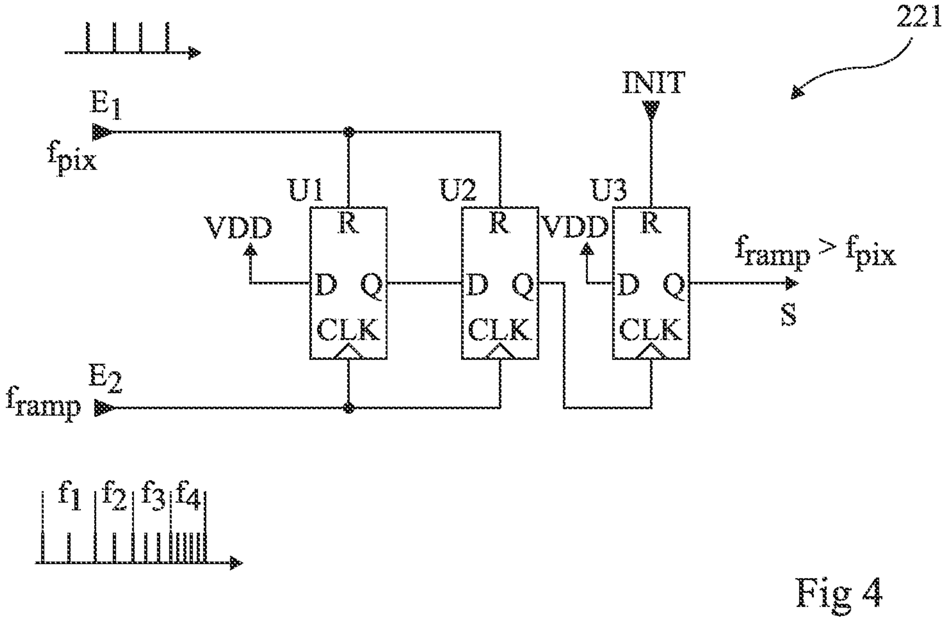
FIG. 4 shows in further detail an example of embodiment of a frequency comparator of a pixel of the image sensor of the system of FIG. 1.

FIG. 4 shows in further detail an example of forming of the frequency comparator 221 of FIG. 3.

In this example, frequency comparator 221 comprises three D-type flip-flops U1, U2, and U3. Each of flip-flops U1, U2, and U3 comprises an input node D, an output node Q, a reset node R, and a node CLK of application of a clock signal or turn-on signal.

Flip-flop U1 has its input node D coupled, for example, connected, to a node of application of a high reference potential VDD, for example corresponding to a logic state '1'.

Flip-flop U1 has its output node Q coupled, for example, connected, to the input node D of flip-flop U2.

Flip-flop U2 has its output node Q coupled, for example, connected, to the turn-on node CLK of flip-flop U3.

Flip-flop U3 has its input node D coupled, for example, connected, to node VDD.

Flip-flops U1 and U2 have their reset nodes R coupled, for example, connected, to a node of application of signal $f_{pix}$, corresponding to the input node E1 of the comparator.

Flip-flops U1 and U2 have their turn-on nodes CLK coupled, for example, connected, to a node of application of signal $f_{ramp}$, corresponding to the input node E2 of the comparator.

Flip-flop U3 has its reset node R coupled, for example, connected, to a node of application of an initialization signal INIT of the comparator.

Flip-flop U3 has its output node Q coupled, for example connected, to a node for delivering a binary output signal of the comparator, corresponding to the output node S of the comparator.

Signal $f_{ramp}$ is generated in stages of increasing frequency (f1, f2, f3, f4, etc.), with a determined duration per stage, for example, a constant duration, which defines a measurement cycle. Signal $f_{ramp}$ controls the clock inputs CLK of the first two flip-flops U1 and U2, and signal $f_{pix}$ controls the reset inputs (R) of the first two flip-flops U1 and U2.

When the frequency of signal $f_{ramp}$ is greater than the frequency of signal $f_{pix}$, there is, during the measurement cycle, a time when, between two consecutive pulses of signal $f_{ramp}$, there is no resetting of flip-flops U1 and U2 by signal $f_{pix}$. The Q output of flip-flop U2 then switches to the high state. This state is stored by flip-flop U3 and transmitted on the Q output node of flip-flop U3. Signal INIT allows the resetting of the measurement.

The described embodiments are not limited to the specific example of embodiment of frequency comparator 221.

Figure 5:
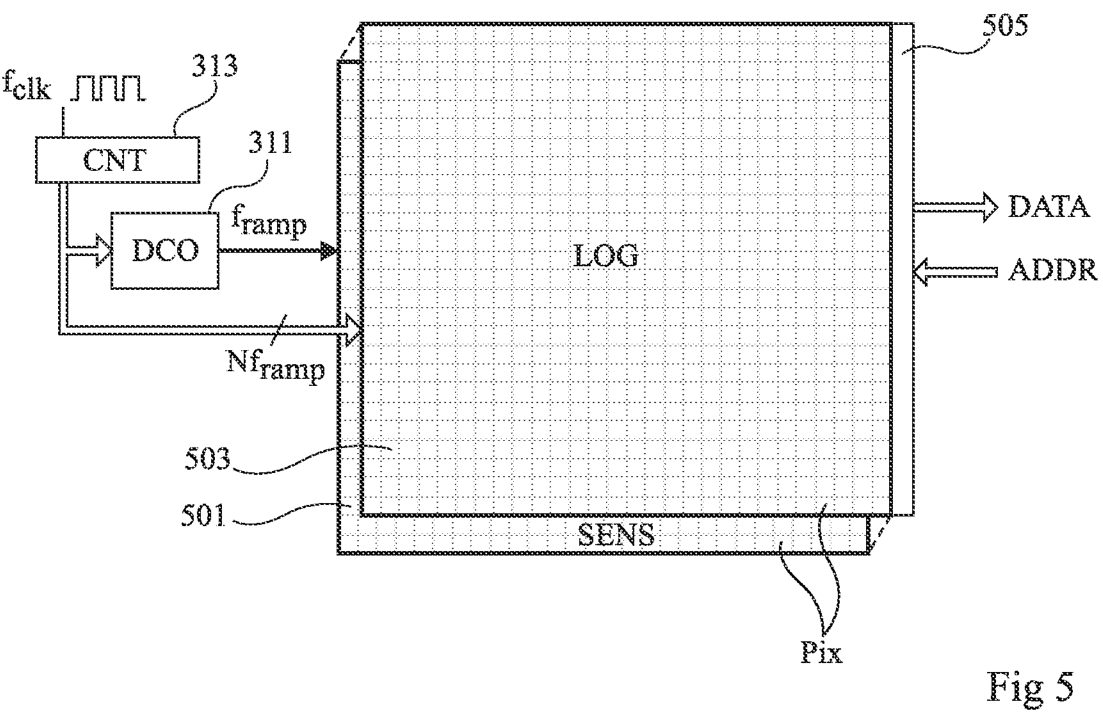
FIG. 5 is a very simplified general view of the circuits of the image sensor of the system of FIG. 1.

FIG. 5 is a very simplified general view of the circuits of the image sensor 109 of the system of FIG. 1.

As illustrated in FIG. 5, counter 313 and oscillator 311 are common to all the pixels of the array of pixels Pix.

The array of pixels Pix is for example formed of two different stacked layers of integrated circuits 501 (SENS) and 503 (LOG), for example assembled and electrically connected to each other by hybrid bonding, or formed in sequential 3D technology. Layer 501 for example comprises the analog reception chain 201 of pixels Pix, particularly comprising the photodetectors 211 of the pixels. Layer 503 for example comprises the digital processing chain 203 of pixels Pix, particularly comprising the frequency comparators 221 of the pixels.

Sensor 109 may further comprise an addressing and readout circuit 505 coupled to an output data bus DATA and to an input address bus ADDR, enabling to read from the registers 223 of pixel array Pix similarly to an integrated memory circuit.

Addressing and readout circuit 505 is for example integrated in integrated circuit layer 503. Oscillator 311 and counter 313 (peripheral circuits 301 of FIG. 3) may also be integrated in layer 503.

Figure 6:
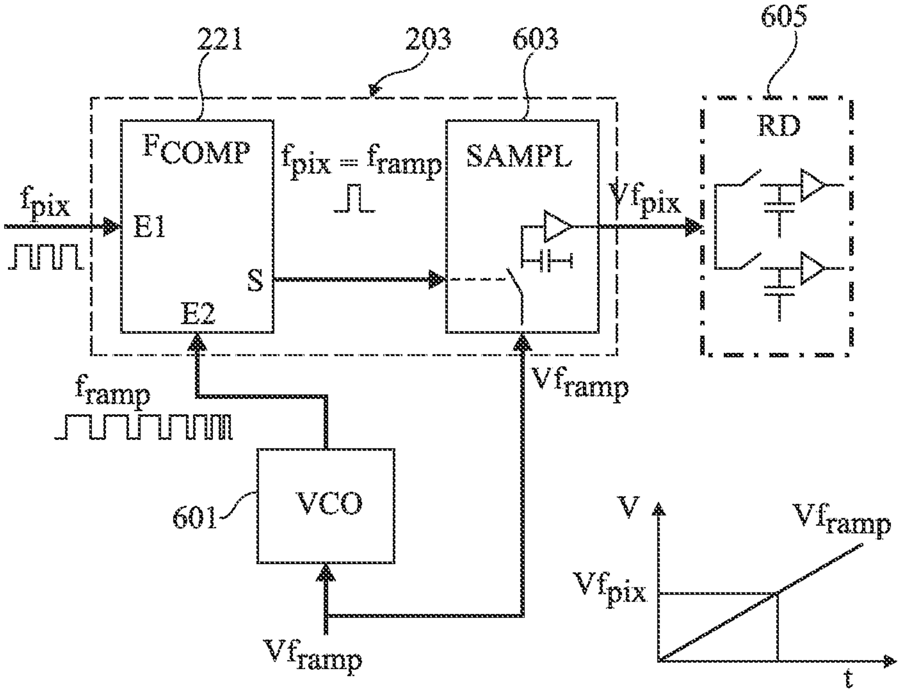
FIG. 6 schematically shows, in the form of blocks, a portion of the circuits of the image sensor of the system of FIG. 1 according to a first alternative embodiment.

FIG. 6 schematically shows in the form of blocks part of the circuits of the image sensor of the system of FIG. 1 according to a first alternative embodiment.

In this first variant, digitally-controlled oscillator 311 (FIG. 3) is replaced with a voltage-controlled oscillator 601 or VCO.

The digital control ramp $Nf_{ramp}$ delivered by counter 313 (FIG. 3) is replaced with an increasing voltage ramp $V_{framp}$, for example, linear. Digital storage circuit 223 (FIG. 3) is replaced with an analog storage circuit 603, for example, a sample and hold device.

The operation is similar to what has been described hereabove in relation with FIG. 3, but for the fact that, in the variant of FIG. 6, the quantity to be stored during the switching of the output signal of comparator 221 is the value $V_{fpix}$ of the set point voltage $V_{framp}$ of oscillator 601 at the time of the switching of the output signal of comparator 221. This value defines the output value of the pixel. Storage circuit 603 for example comprises a capacitive element, for example, a capacitor, and a switch controlled by the output signal of comparator 221 to sample the value of voltage $V_{framp}$ in the capacitive element during the switching of comparator 221.

Voltage $V_{fpix}$, representative of the frequency of signal $f_{pix}$, can then be read, for example, by means of a readout circuit 605 (RD) located at the foot of each column of the array of pixels Pix, for example by a readout method similar to that of an image sensor in CMOS technology. As a non-limiting example, readout circuit 605 is a double-sampling circuit, which for example enables to do away with manufacturing dispersions, and particularly of the threshold voltage, of a voltage follower transistor of circuit 603. Once read by circuit 605, value $V_{fpix}$ may be digitized to be used by the acquisition system.

Figure 7:
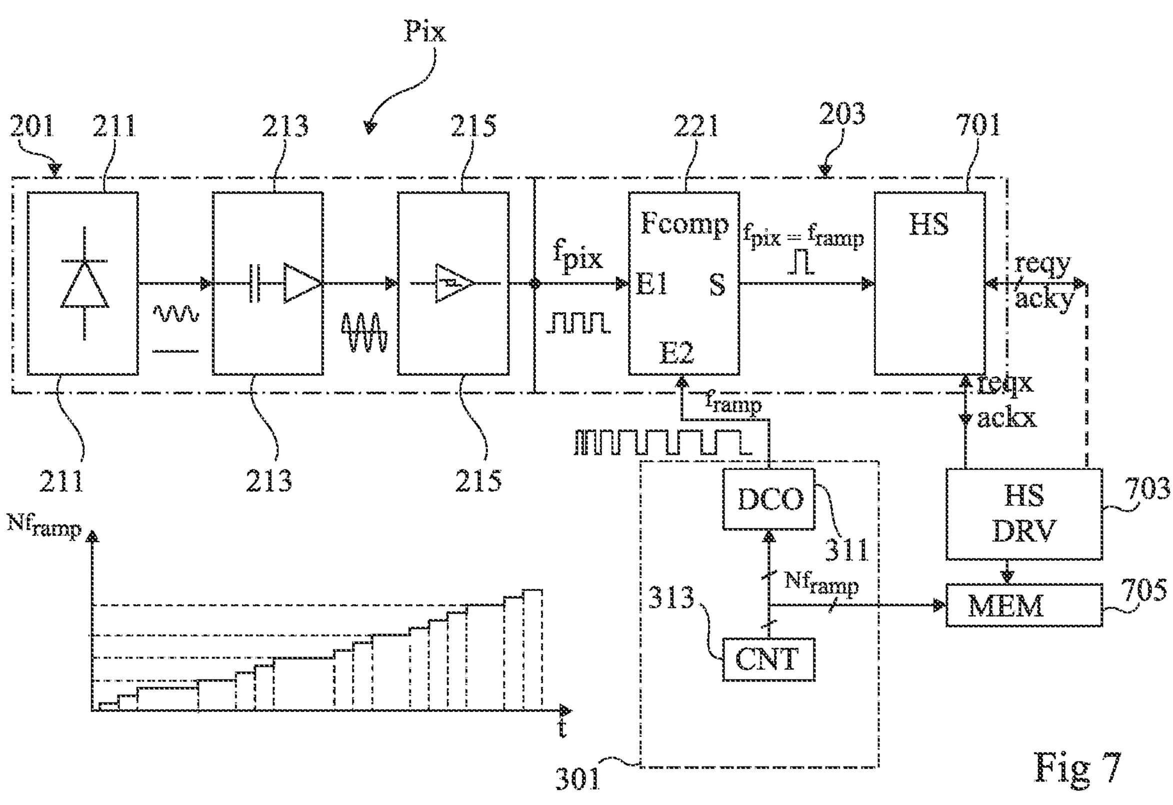
FIG. 7 schematically shows in the form of blocks a portion of the circuits of the image sensor of the system of FIG. 1 according to a second alternative embodiment.

FIG. 7 schematically shows, in the form of blocks, part of the circuits of the image sensor of the system of FIG. 1 according to a second alternative embodiment.

In this second variant, the sensor has an architecture based on the detection of events. In this architecture, the pixel array is non-sequentially read along the events, an event corresponding to the switching of frequency comparator 221 in a pixel Pix of the array.

For this purpose, in each pixel Pix, storage register 223 (FIG. 3) is replaced with a handshake circuit 701 (HS). The latter manages the communication with the periphery to avoid conflicts when a plurality of events occurs simultaneously. As an example, when the comparator 221 of a pixel switches (when the frequency of signal $f_{ramp}$ exceeds the frequency of signal $f_{pix}$), the circuit 701 of the pixel transmits a row acknowledgement request signal reqy over a row conductive track of the pixel array. This request is received by a processing circuit 703 (HS DRV) external to the pixel array. Circuit 703 transmits in return a row acknowledgement signal acqy over a row conductive track of the pixel array. On reception of this signal, pixel circuit 701 transmits a column acknowledgement request signal over a column conductive track of the pixel array. This request is received by circuit 703 which transmits in return a column acknowledgement signal acqx over a column conductive track of the pixel array. On reception of this signal, the circuit 701 of the pixel blocks any new request until an initialization signal is sent again to the pixel. The analog receive chain 201 of pixel Pix may further be set to standby until the reception of the initialization signal, to limit the electric power consumption of the sensor. Based on request signals reqy and reqx, external circuit 703 can decode the address of the pixel Pix having triggered the event. This address, as well as the value $N_{framp}$ of counter 313 at the time of the detection of the event (representative of the frequency of signal $f_{pix}$ read by the pixel), may be stored in a memory circuit 705 (MEM) external to the pixel array.

The operation and the forming of handshake circuits 701 and 703 will not be described in further detail hereafter, the forming of these circuits being within the abilities of those skilled in the art based on the indications of the present disclosure. In particular, this second variant is compatible with usual handshake circuits in known event-based or asynchronous sensors, for example, circuits of the type described in patent application FR3109667 previously filed by the applicant.

Apart from the event-based readout mode, which differs from the synchronous readout mode of the example of FIG. 3, the operation of the sensor of FIG. 7 is similar to what has been previously described in relation with FIGS. 1 to 5, with the difference that, in the example of FIG. 7, the readout time for each frequency stage of signal $f_{ramp}$ is not constant. More particularly, at each stage, the value $N_{framp}$ of counter 313 has to remain fixed until all the pixels Pix having generated an event at this frequency stage have been decoded.

A series of pixel addresses is thus obtained for each frequency stage of signal $f_{ramp}$. These addresses are stored in memory circuit 705, with the corresponding frequency set point value $N_{framp}$.

An advantage of the variant of FIG. 7 is that it enables to decrease the complexity of the circuits internal to the pixels Pix of the array, and thus favor the pixel integration density. Indeed, logic handshake block 701 requires a combinational logic with a limited number of components, for example in the order of thirty transistors per pixel, smaller than the number of components of the storage circuit 223 (REG) of the example of FIG. 3.

Another advantage is that it is not necessary to convey the output signal $N_{framp}$ of counter 313 within the pixel array, but only towards memory circuit 705. Here again, this enables to improve the integration density of the pixel array. Further, this enables to significantly decrease the electric power consumption.

Given that the pixels are read in the increasing order with respect to their frequency (and thus distance) value, it is possible to set the frequency ramp to, for example, only detect pixels in a predefined distance range, or even at a single predefined distance. In this case, the pixels outside of the targeted range will not be read, which enables to increase the readout speed and to decrease the electric power consumption.

Further, due to the readout mode by order of increasing distances, a histogram can be directly generated during the reading, to give an overview of the distribution of the scene. For this purpose, it may be provided to count the number of pixels read from at each frequency stage, and to store the result in memory circuit 705. This information may be used to, for example, readjust the frequency ramp, that is, the value of counter $N_{framp}$ and/or the duration of the stages, or to retroact on the light source of the system, for example by modifying the optical frequency of the emitted radiation, to obtain a better resolution of the depth image.

Figure 8:
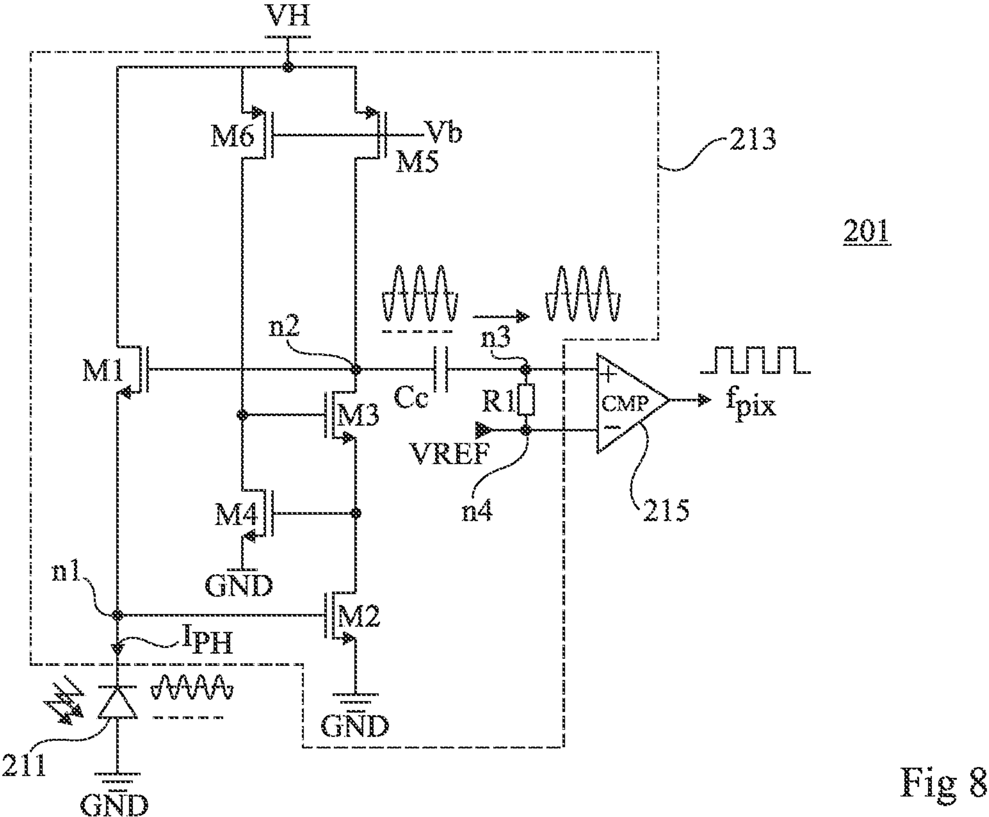
FIG. 8 shows in further detail an example of embodiment of the circuits of FIG. 2.

FIG. 8 shows in further detail an example of forming of the reception processing chain 201 (FIG. 2) of a pixel Pix of an image sensor according to an embodiment.

In this example, photodetector 211 is a photodiode biased to transform the received photonic signal into current, which is converted into voltage to be able to extract the AC component, which will be subsequently processed to determine the beat frequency of the heterodyne beam received by the pixel to reconstruct a depth map or 3D image of the scene.

In this example, photodiode 211 has its anode coupled, for example, connected, to a node GND of application of a low reference potential, for example, the ground.

In this example, filtering and amplification circuit 213 comprises six transistors M1, M2, M3, M4, M5, and M6. As an example, transistors M1, M2, M3, and M4 are N-channel MOS transistors, and transistors M5 and M6 are P-channel MOS transistors.

Transistor M1 has its source coupled, for example connected, to the cathode of photodiode 211 (node n1 in the figure) and its drain coupled, for example connected, to a node of application of a high reference potential VH. Transistor M2 has its source coupled, for example connected, to node GND and its drain coupled, for example connected, to the source of transistor M3. Transistor M3 has its drain coupled, for example connected, to the drain of transistor M5. Transistor M5 has its source coupled, for example connected, to node VH. Transistor M4 has its source coupled, for example connected, to node GND, and its drain coupled, for example connected, to the drain of transistor M6. Transistor M6 has its source coupled, for example connected, to node VH.

The gate of transistor M1 is coupled, for example connected, to the midpoint between transistors M3 and M5, that is, to the drain of transistor M3 and to the drain of transistor M5 (node n2 in the figure). The gate of transistor M2 is coupled, for example connected, to node n1. The gate of transistor M3 is coupled, for example connected, to the midpoint of transistors M4 and M6, that is, to the drain of transistor M4 and to the drain of transistor M6. The gate of transistor M4 is coupled, for example connected, to the midpoint between transistors M2 and M3, that is, to the drain of transistor M2 and to the source of transistor M3. In this example, the gates of transistors M5 and M6 are coupled, for example, connected, to a node of application of a bias potential Vb. Transistors M5 and M6 thus form two current sources intended to respectively bias the branch comprising transistors M2 and M3 and the branch comprising transistor M4.

In the example of FIG. 8, circuit 213 further comprises a capacitive decoupling element Cc, for example, a capacitor, having a first electrode coupled, for example connected, to node n2, and a second electrode coupled, for example connected, to a node n3. Circuit 213 further comprises a resistive element R1 of fixed resistance, for example a resistor or a diode-assembled MOS transistor, having a first end coupled, for example, connected, to node n3 and a second end coupled, for example connected, to a node n4. In operation, node n4 receives a reference potential VREF.

In this example, voltage comparator 215 (CMP) has a first input or positive input (+) coupled, for example connected, to node n3, and a second input or negative input (−) coupled, for example connected, to node n4.

The photocurrent $I_{PH}$ generated by photodiode 211 on node n1 is converted into voltage and amplified on node n2. Capacitive decoupling element Cc enables to filter the DC component of the amplified signal delivered on node n2. Resistive element R1 enables to bias the positive input terminal (+) of comparator 215 to voltage VREF, around which the AC component of the amplified signal will vary on node n3. The same voltage VREF is used as a reference for the comparator to perform the operation of quantization over 1 bit by comparator 215.

The output binary AC voltage $f_{pix}$ of chain 201 is delivered on an output node of comparator 215.

More generally, those skilled in the art will be capable of providing other implementations of the analog reception chain 201 of the sensor pixels Pix, and in particular of circuit 213 of amplification and filtering of the output signal of the photodetectors of the pixels, for example implementations of the type described in the article entitled "A Dynamic Vision Sensor With 1% Temporal Contrast Sensitivity and In-Pixel Asynchronous Delta Modulator for Event Encoding" of M. Yang, S. -C. Liu, and T. Delbruck (IEEE Journal of Solid-State Circuits, vol. 50, no. 9, pp. 2149-2160, September 2015).

Various embodiments and variants have been described. Those skilled in the art will understand that certain features of these various embodiments and variants may be combined, and other variants will occur to those skilled in the art. In particular, although only examples of embodiment where the frequency of signal $f_{ramp}$ applied to input E2 of frequency comparator 221 varies according to an increasing law have been described, the described embodiments are not limited to this specific case. More generally, the frequency of signal $f_{ramp}$ may vary according to any other law, preferably monotonous, for example, a decreasing law.

Further, although examples of embodiment where each pixel Pix of image sensor 109 comprises a circuit for detecting a beat frequency of a portion of a heterodyne beam received by the elementary photodetector of the pixel have been described hereabove, the described embodiments are not limited to this specific case. As a variant, a portion of or the entire beat frequency detection circuit may be offset outside of the pixel, for example, at the foot of a column in the case of an array sensor. In particular, in the examples of FIGS. 2, 3, and 6, the digital processing chain and particularly frequency comparator 221 may be common to all the pixels of a same column. Similarly, the circuits of amplification 213 and of quantization over 1 bit 215 may be shared per column. This enables to decrease the size of the pixels and thus to increase the pixel integration density. The reading from the sensor then is a rolling shutter reading, row by row.

Finally, the practical implementation of the described embodiments and variations is within the abilities of those skilled in the art based on the functional indications given hereabove.

What is claimed is:

1. An image sensor comprising a plurality of pixels each comprising an elementary photodetector, the sensor comprising, for each pixel, a circuit for detecting a beat frequency of a portion of a heterodyne beam received by the elementary photodetector of the pixel, the detection circuit comprising a frequency comparator comprising a first input node receiving a first periodic AC signal having a frequency equal to said beat frequency, a second input node receiving a second AC signal of variable frequency, and an output node delivering an output signal switching from a first state to a second state when the frequency of the second signal exceeds the frequency of the first signal.

2. The image sensor according to claim 1, comprising a circuit for generating the second signal, common to all the pixels of the sensor.

3. The image sensor according to claim 2, wherein the circuit for generating the second signal comprises a digitally-controlled oscillator delivering the second signal, and a digital counter generating a signal for controlling the digitally-controlled oscillator.

4. The image sensor according to claim 3, comprising, for each pixel, a digital register controlled by the output signal of the frequency comparator of the pixel and configured to store the value of the control signal of the digitally-controlled oscillator at the switching of the output signal of the frequency comparator of the pixel.

5. The image sensor according to claim 4, further comprising a circuit for addressing and reading from the digital registers of the pixels.

6. The image sensor according to claim 3, wherein each pixel comprises a circuit for detecting said beat frequency, the sensor comprising circuits of event-based detection of the switchings of the output signals of the frequency comparators of the pixels, said circuits being configured to, at each switching of the output signal of the frequency comparator of a pixel, decode the address of the pixel where the switching has occurred, and write into a memory circuit (705) said address as well as the value of the control signal of the digitally-controlled oscillator at the time of the switching.

7. The image sensor according to claim 2, wherein the circuit for generating the second signal comprises a voltage-controlled oscillator delivering the second signal, and a circuit for generating a control voltage of the voltage-controlled oscillator.

8. The image sensor according to claim 7, comprising, for each pixel, a sampling circuit (603) controlled by the output signal of the frequency comparator and configured to store the value of the control voltage of the voltage-controlled oscillator at the switching of the output signal of the frequency comparator.

9. The image sensor according to claim 1, comprising, for each pixel, a circuit for amplifying and filtering an electric signal delivered by the photodetector of the pixel, and a circuit for quantizing over 1 bit an AC component of an output signal of the amplification and filtering circuit, said quantization circuit delivering the first periodic AC signal applied to the first input node of the frequency comparator of the pixel.

10. An imagining system comprising:

the image sensor according to claim 1;

a laser source configured to emit a frequency-modulated light beam;

an optical splitter configured to split the laser beam emitted by the source into a reference beam and an object beam directed towards a scene to be analyzed; and an optical assembly configured to project or convey onto the image sensor a recombined beam formed by the superimposition of the reference beam and of the object beam reflected by the scene.

* * * * *